March 27, 1956  T. V. TYLER  2,739,637
METHOD AND DEVICE FOR BENDING C-STAGE
POSTFORMABLE PLASTIC MATERIAL
Filed Feb. 8, 1954  10 Sheets-Sheet 1

INVENTOR.
TRUMAN V. TYLER
BY
William L. Lane
ATTORNEY

March 27, 1956  T. V. TYLER  2,739,637
METHOD AND DEVICE FOR BENDING C-STAGE
POSTFORMABLE PLASTIC MATERIAL
Filed Feb. 8, 1954  10 Sheets-Sheet 3

INVENTOR.
TRUMAN V. TYLER
BY
William R. Lane
ATTORNEY

March 27, 1956　　　T. V. TYLER　　　2,739,637
METHOD AND DEVICE FOR BENDING C-STAGE
POSTFORMABLE PLASTIC MATERIAL
Filed Feb. 8, 1954　　　　　　　　　　10 Sheets-Sheet 4
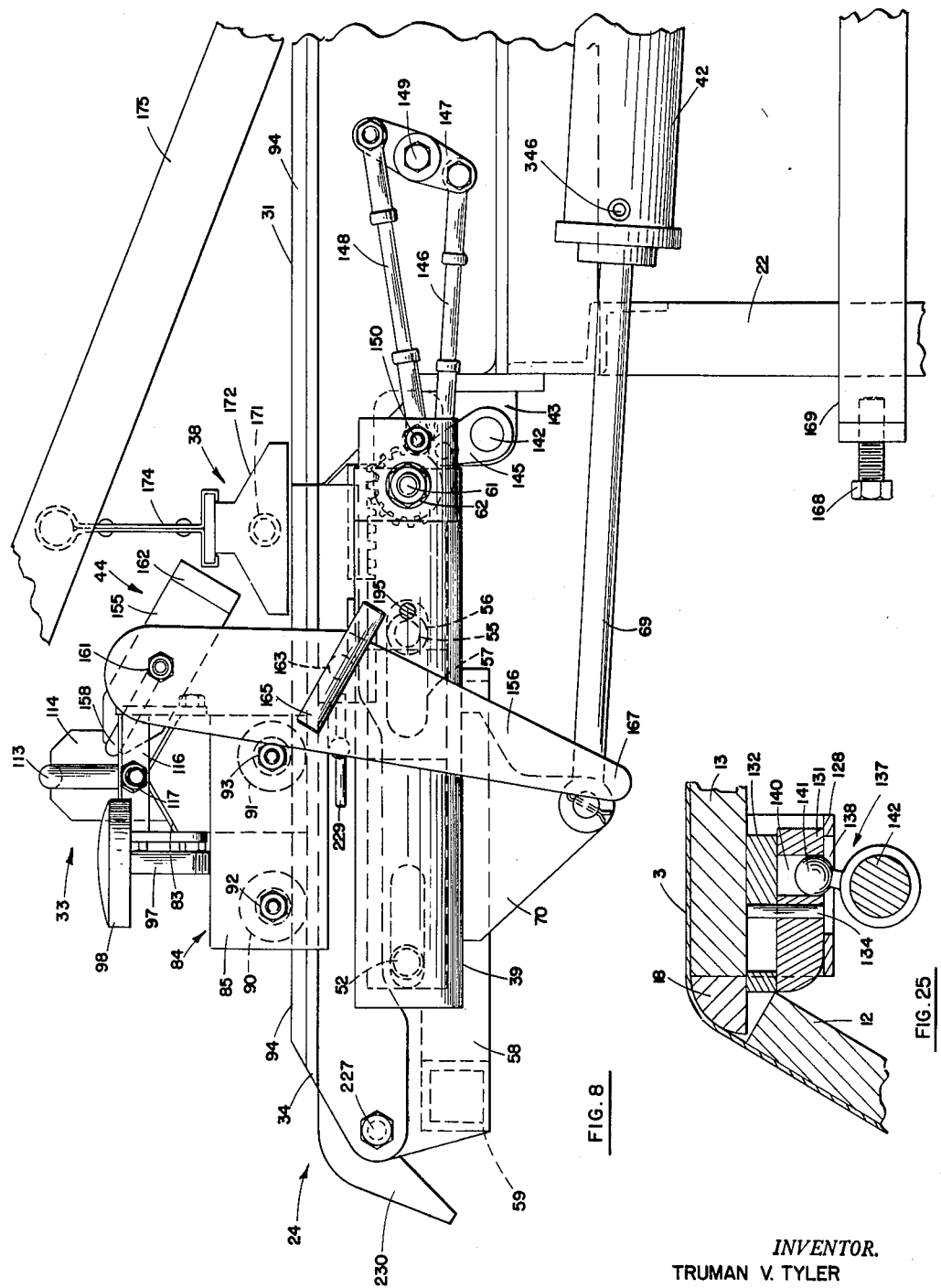
INVENTOR.
TRUMAN V. TYLER
BY
William P. Lane
ATTORNEY

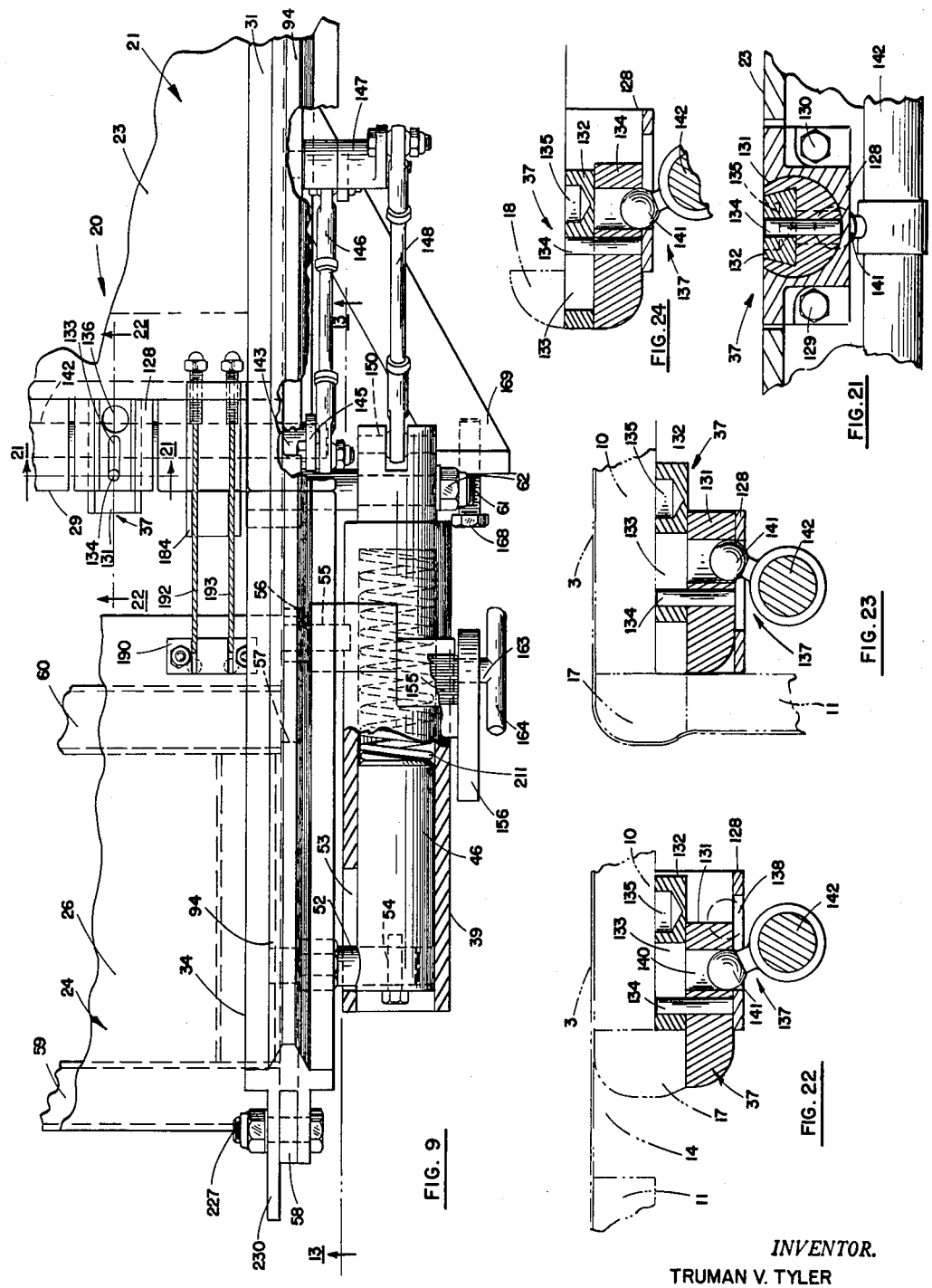

March 27, 1956     T. V. TYLER     2,739,637
METHOD AND DEVICE FOR BENDING C-STAGE
POSTFORMABLE PLASTIC MATERIAL Filed Feb. 8, 1954     10 Sheets-Sheet 6

*INVENTOR.*
TRUMAN V. TYLER
BY
*William R. Lane*
ATTORNEY

INVENTOR.
TRUMAN V. TYLER
BY
William L Lane
ATTORNEY

March 27, 1956 T. V. TYLER 2,739,637
METHOD AND DEVICE FOR BENDING C-STAGE
POSTFORMABLE PLASTIC MATERIAL
Filed Feb. 8, 1954 10 Sheets-Sheet 8
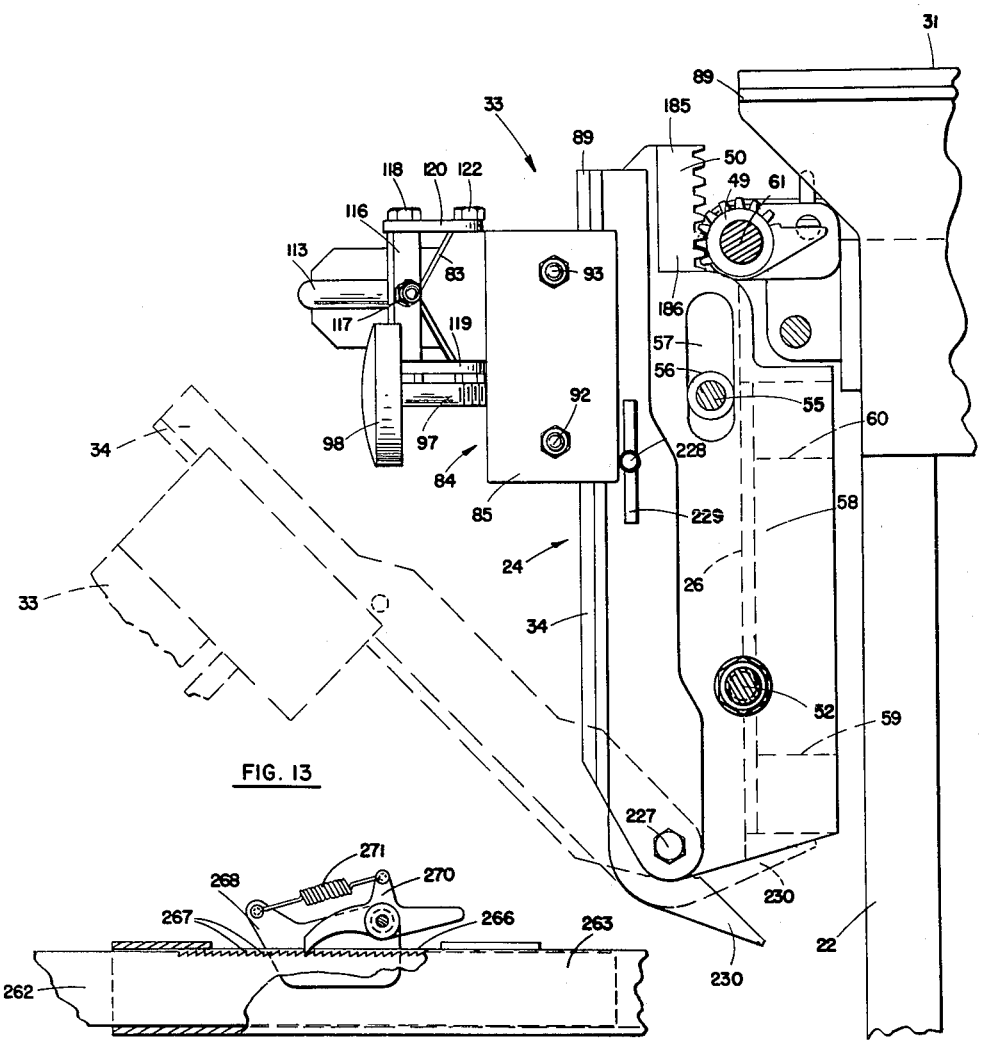
FIG. 13
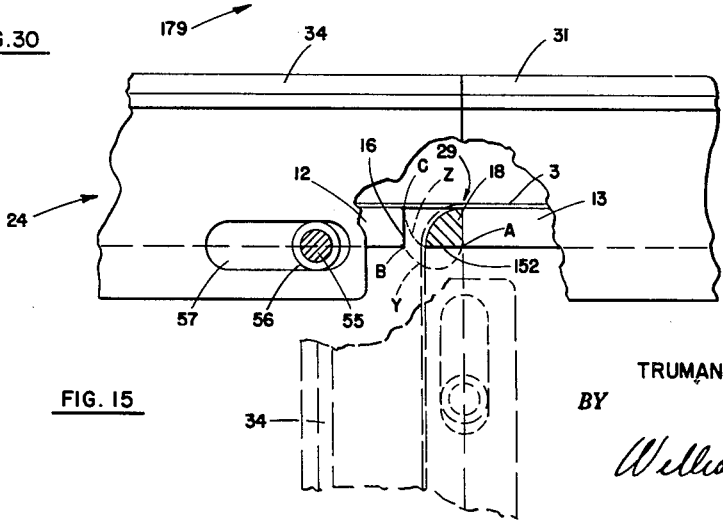
FIG. 30
FIG. 15
*INVENTOR.*
TRUMAN V. TYLER
BY
William L. Lane
ATTORNEY March 27, 1956 T. V. TYLER 2,739,637
METHOD AND DEVICE FOR BENDING C-STAGE
POSTFORMABLE PLASTIC MATERIAL
Filed Feb. 8, 1954 10 Sheets-Sheet 9

*INVENTOR.*
TRUMAN V. TYLER
BY
*William R. Lane*
ATTORNEY

INVENTOR.
TRUMAN V. TYLER
BY
William R Lane
ATTORNEY

United States Patent Office 2,739,637
Patented Mar. 27, 1956

2,739,637

METHOD AND DEVICE FOR BENDING C-STAGE POSTFORMABLE PLASTIC MATERIAL

Truman V. Tyler, Palos Verdes Estates, Calif., assignor to North American Aviation, Inc., Los Angeles, Calif., a corporation of Delaware Application February 8, 1954, Serial No. 408,808

12 Claims. (Cl. 154—1.8)

This invention pertains to a bending machine and more particularly to a machine adapted to bend C-stage postformable plastic material.

As disclosed in U. S. Patent No. 2,433,643, it has been discovered that a plastic C-stage thermosetting resinous material can be postformed after heating to certain temperature ranges. Such material has had wide application both industrially and for the use in producing tops for drain boards and other table or counter tops where curved edges and corners are desired or necessary. In the case of the ordinary kitchen drain board, for example, it has been found that C-stage thermosetting resin impregnated material formed into a lamination with a decorative sheet of material at the surface and reinforced on the underside with plywood provides a durable article with a very pleasing appearance when curved to form a one-piece backsplash, counter surface and no-drip edge portion. However, the use of this material in the production of such drain board units has been handicapped by lack of adequate equipment to provide satisfactory bending operations. It has been difficult to provide uniform heating of the portion of the sheet of plastic to be bent, and it has been found very troublesome to obtain bending forces on the material of the right type and magnitude. Furthermore, all types of existing equipment have required a great deal of time-consuming, costly material handling.

Therefore, it is an object of this invention to provide a bending machine that will automatically bend postformable plastic material.

Another object of this invention is to provide a bending machine which will provide inside and outside bends.

A still further object of this invention is to provide a machine which will produce a bend having a single, constant curvature or will provide a bend with a reverse curvature.

An additional object of this invention is to provide a machine having a heater means which will provide localized heating of a bendable portion of a workpiece.

Yet another object of this invention is to provide a bending machine having a retractable die supporting means so that for an outside bend the die may become an integral part of the postformed unit when the bending operation is complete.

Still another object of this invention is to provide a bending machine having die supporting means which are adjustable for dies of various thicknesses.

A further object of this invention is to provide a bending machine having heater means which are automatically removed from heat transfer relationship with a workpiece upon bending of the workpiece.

Another object of this invention is to provide a bending machine having means to position a workpiece whereby a bendable portion thereof is disposed adjacent a die means.

A still further object of this invention is to provide a bending machine which will form material about a die whereby the path of an involute curve is followed.

Yet another object of this invention is to provide a bending machine having means to automatically effect a bending operation when a workpiece has attained a predetermined temperature.

Another object of this invention is to provide a bending machine whereby unreinforced sheet material may be caused to follow an exact predetermined path.

A further object of this invention is to provide a bending machine arranged so that die member interlocks with a reinforcing member, whereby the die may become an integral part of a completed unit.

These and other objects will become apparent from the following detailed description taken in connection with the accompanying drawing in which—

Figure 3:
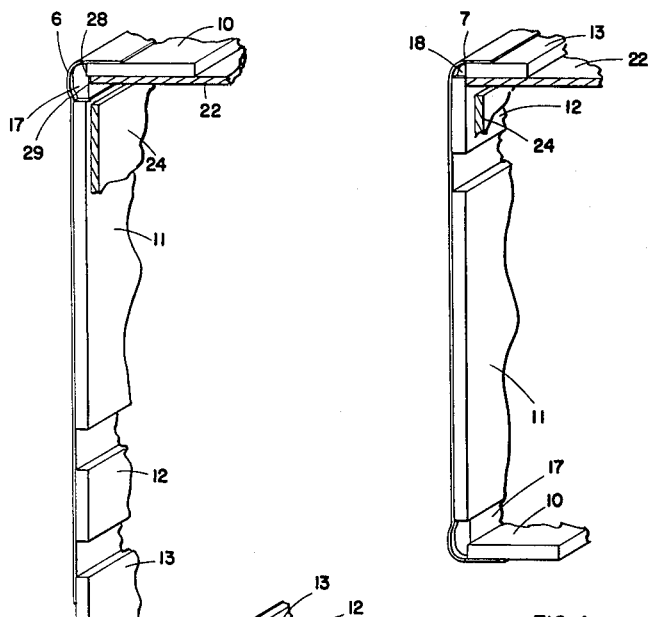
Figure 4:
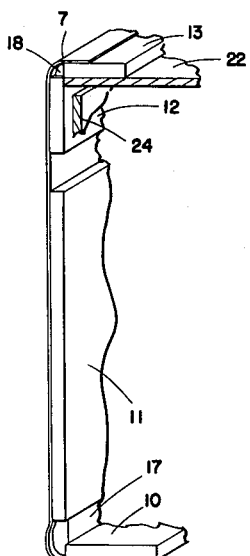
Figure 5:
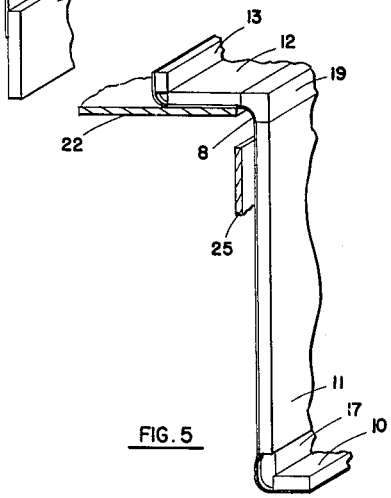
Figure 6:
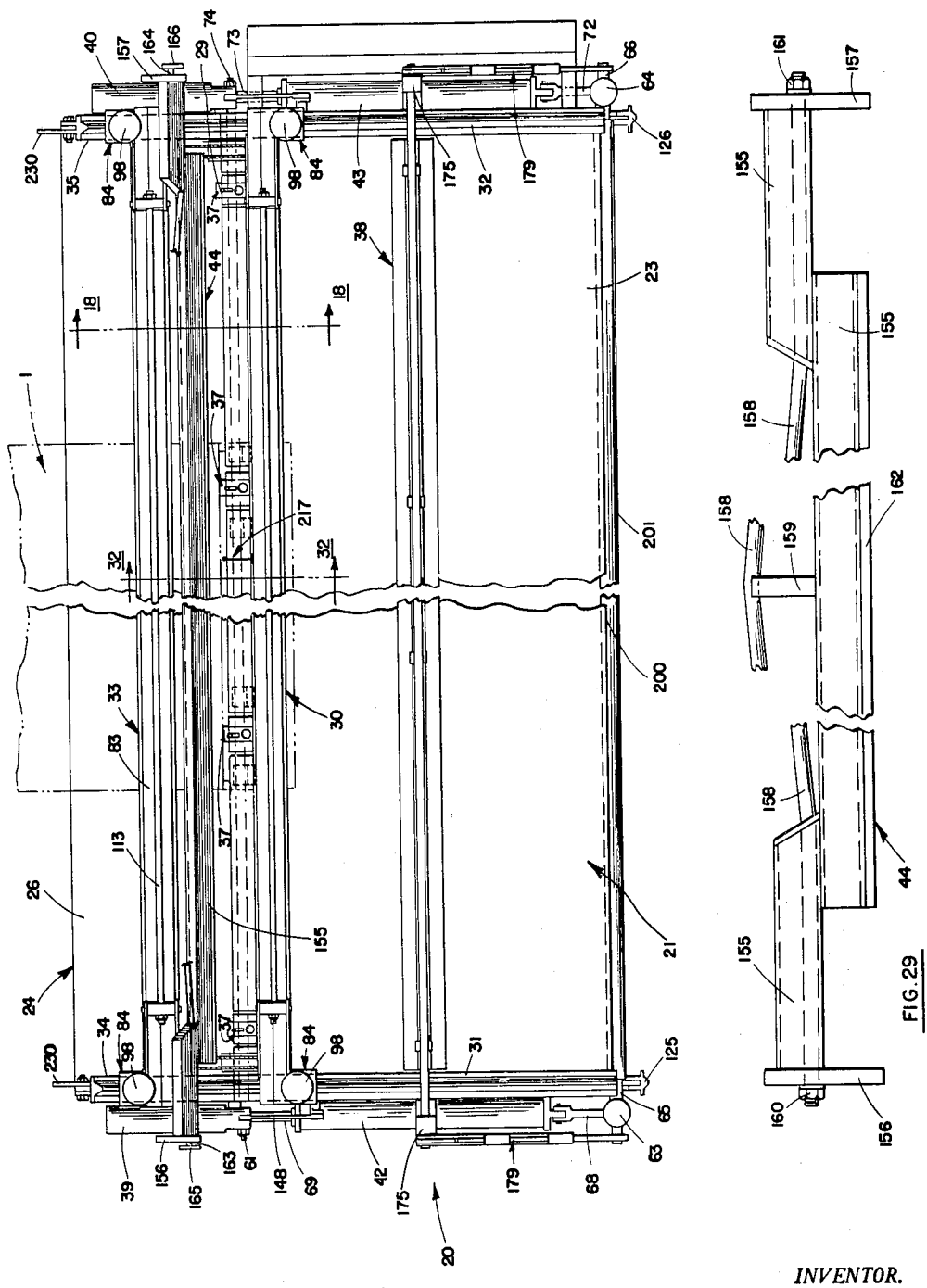
Figures 7, 17:
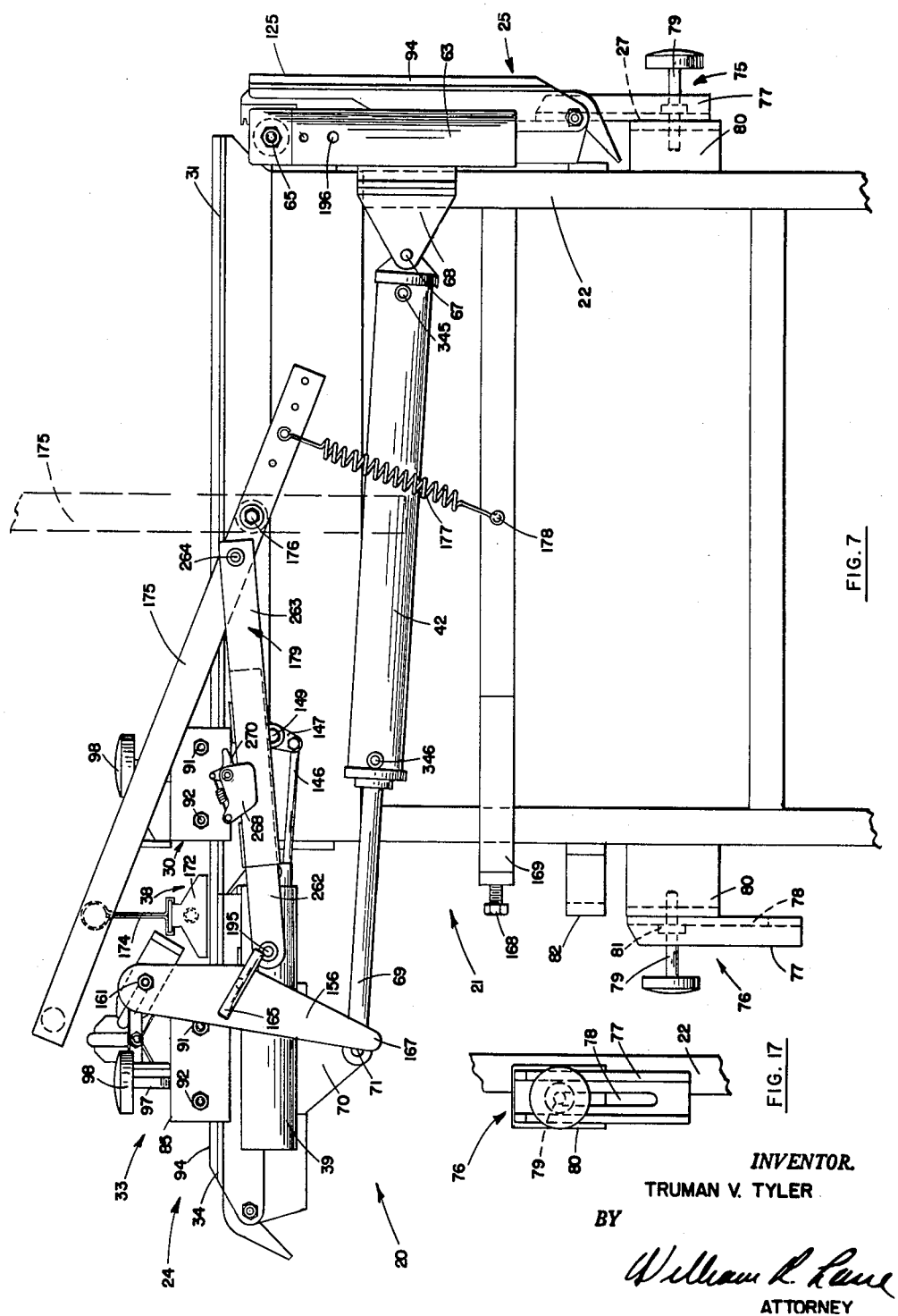
Figure 31:
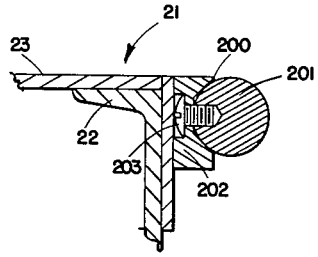
Figure 10:
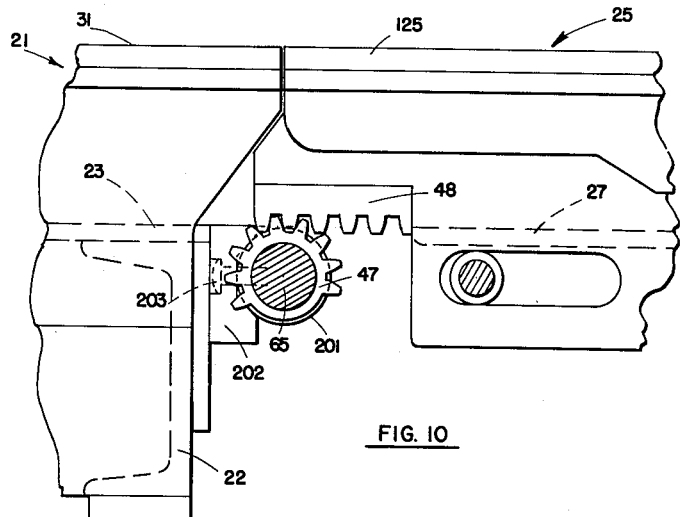
Figure 26:
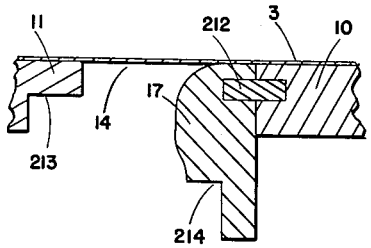
Figure 16:
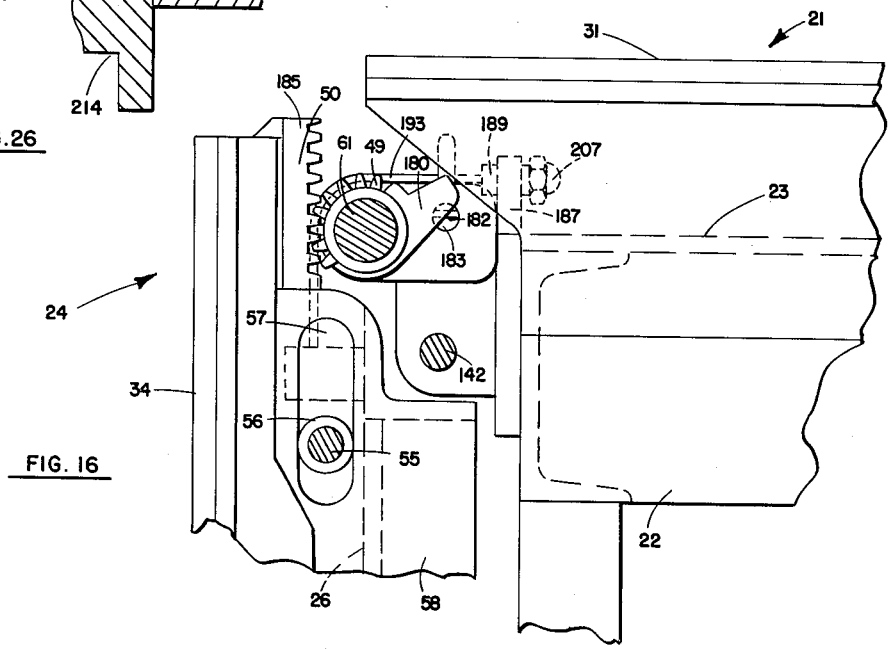
Figure 27:
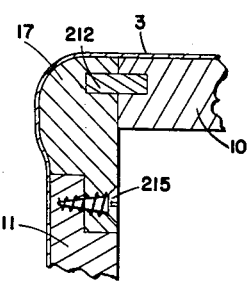
Figure 28:
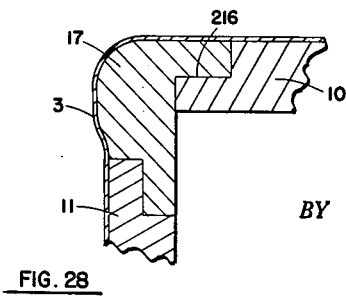
Figure 12:
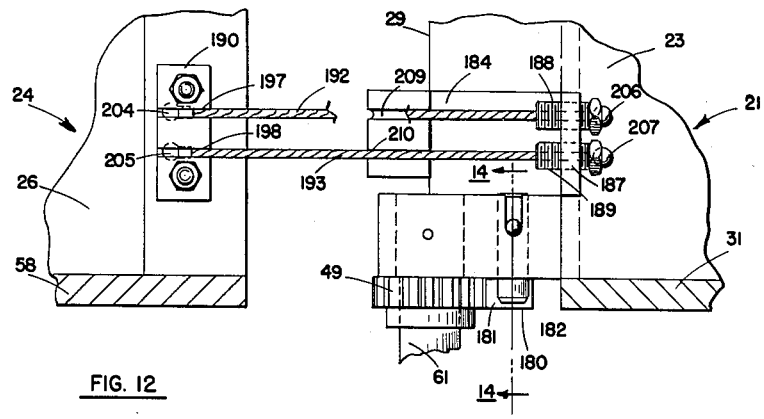
Figure 11:
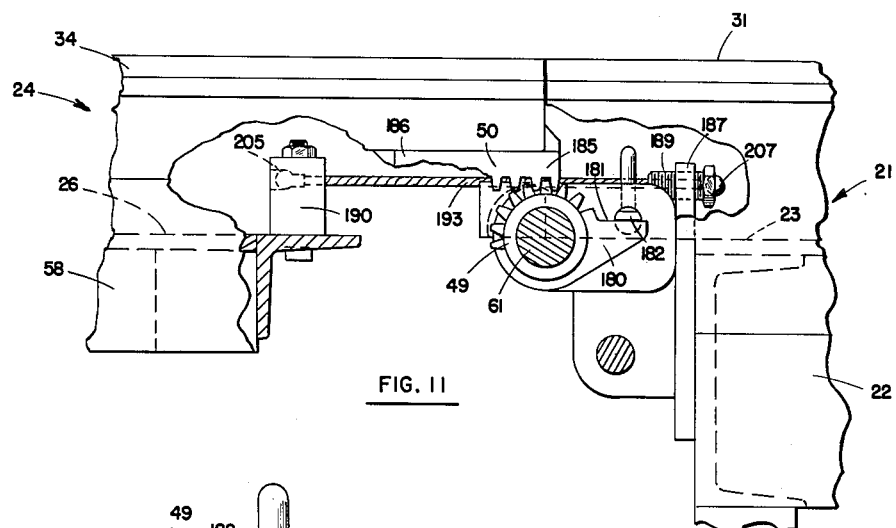
Figures 14, 32:
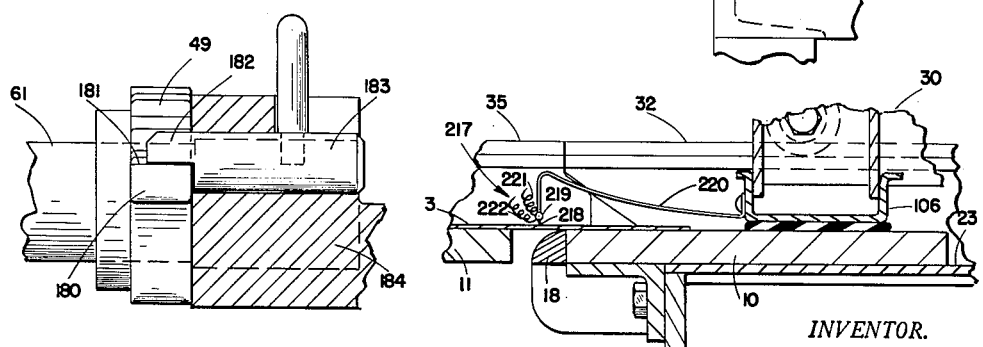
Figure 18:
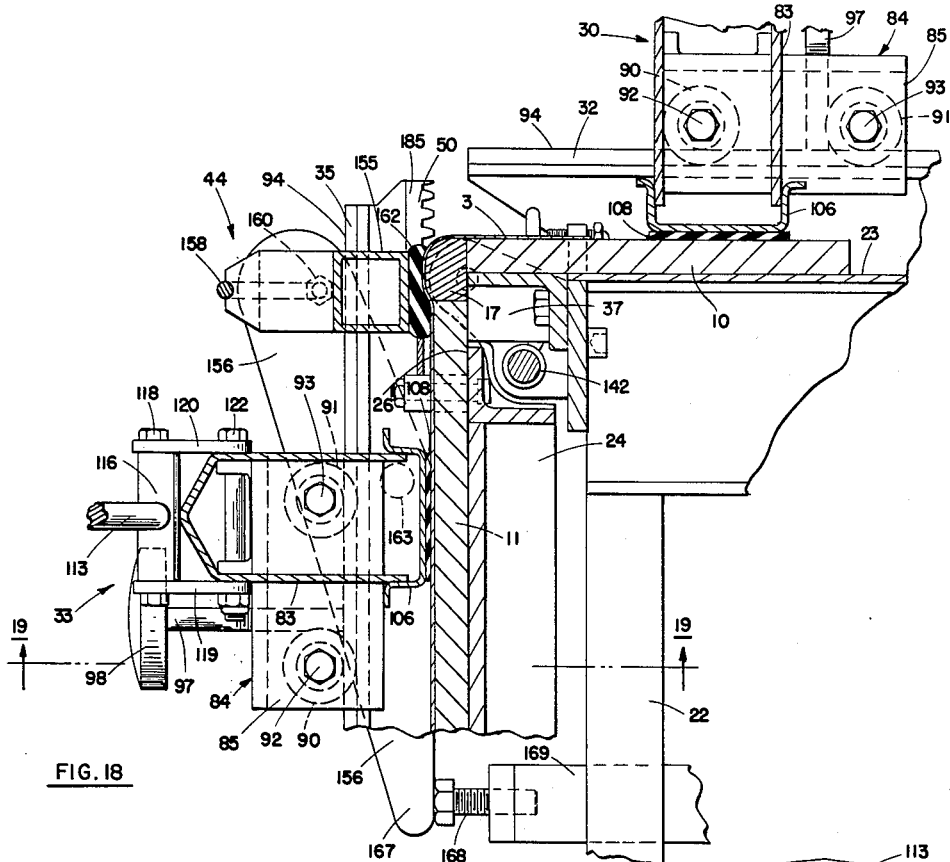
Figure 19:
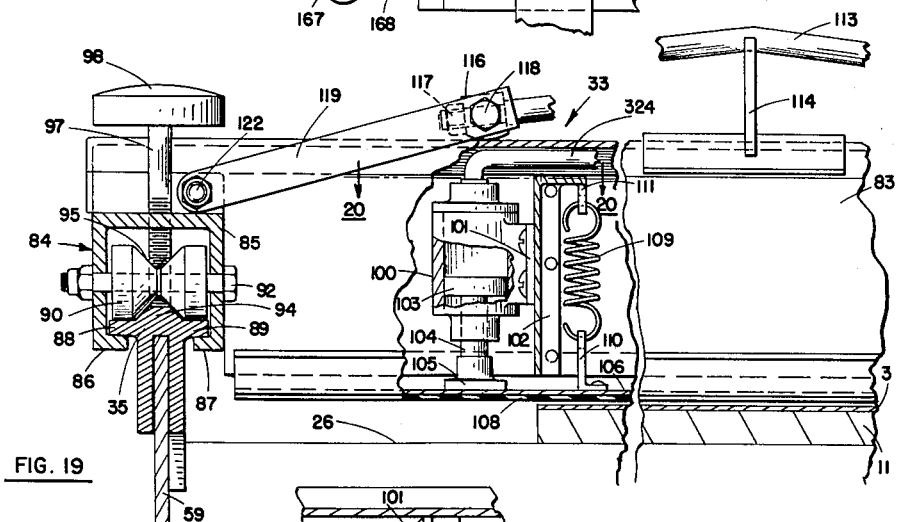
Figure 20:
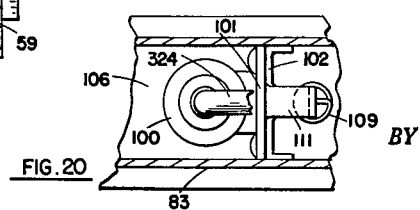

Figs. 3, 4, and 5 are fragmentary perspective views illustrating the various bending operations, Fig. 6 is a top plan view of the bending machine;

Fig. 7 is a side elevational view of the machine;

Fig. 8 is an enlarged fragmentary side elevational view of the machine;

Fig. 9 is a fragmentary top plan view illustrating the guide cylinders, retractable fingers and other detailed arrangements;

Fig. 10 is a side elevational view, partially in section, showing the rack and gear arrangement for one drop leaf;

Fig. 11 is a side elevational view, partially in section, showing the rack and gear, and the cable guide means for the other drop leaf;

Fig. 12 is a top plan view, partially in section, of the arrangement of Fig. 11;

Fig. 13 is a sectional view taken along line 13—13 of Fig. 9, but with the drop leaf in a lowered position;

Fig. 14 is an enlarged sectional view taken along line 14—14 of Fig. 12;

Fig. 15 is a fragmentary side elevational view illustrating the kinematics of the bending operation;

Fig. 16 is a side elevational view, partially in section, showing the drop leaf in a lowered position when the cable guide means is employed;

Fig. 17 is a side elevational view of a drop leaf down lock;

Fig. 18 is a sectional view taken along line 18—18 of Fig. 6, but with the drop leaf in a lowered position;

Fig. 19 is a sectional view taken along line 19—19 of Fig. 18;

Fig. 20 is a sectional view taken along line 20—20 of Fig. 19;

Fig. 21 is a sectional view taken along line 21—21 of Fig. 9, illustrating a retractable reinforcing member support;

Fig. 22 is a sectional view taken along line 22—22 of Fig. 9 illustrating a retractable reinforcing member support;

Figs. 23, 24 and 25 are fragmentary sectional views similar to Fig. 22 illustrating the operation of the retractable reinforcing member support;

Fig. 26 is a fragmentary sectional view of a workpiece illustrating an alternative support means for the curved reinforcing member;

Fig. 27 is a fragmentary sectional view of the workpiece of Fig. 26 after the forming operation;

Fig. 28 is a fragmentary sectional view showing a modified means of holding the curved reinforcing member;

Fig. 29 is a side elevational view of the auxiliary forming member for producing a no-drip edge;

Fig. 30 is a fragmentary elevational view, partially in section, illustrating the telescoping heater link;

Fig. 31 is a fragmentary sectional view taken along line 31—31 of Fig. 6, and Fig. 32 is a sectional view taken along line 32—32 of Fig. 6.

Figure 33:
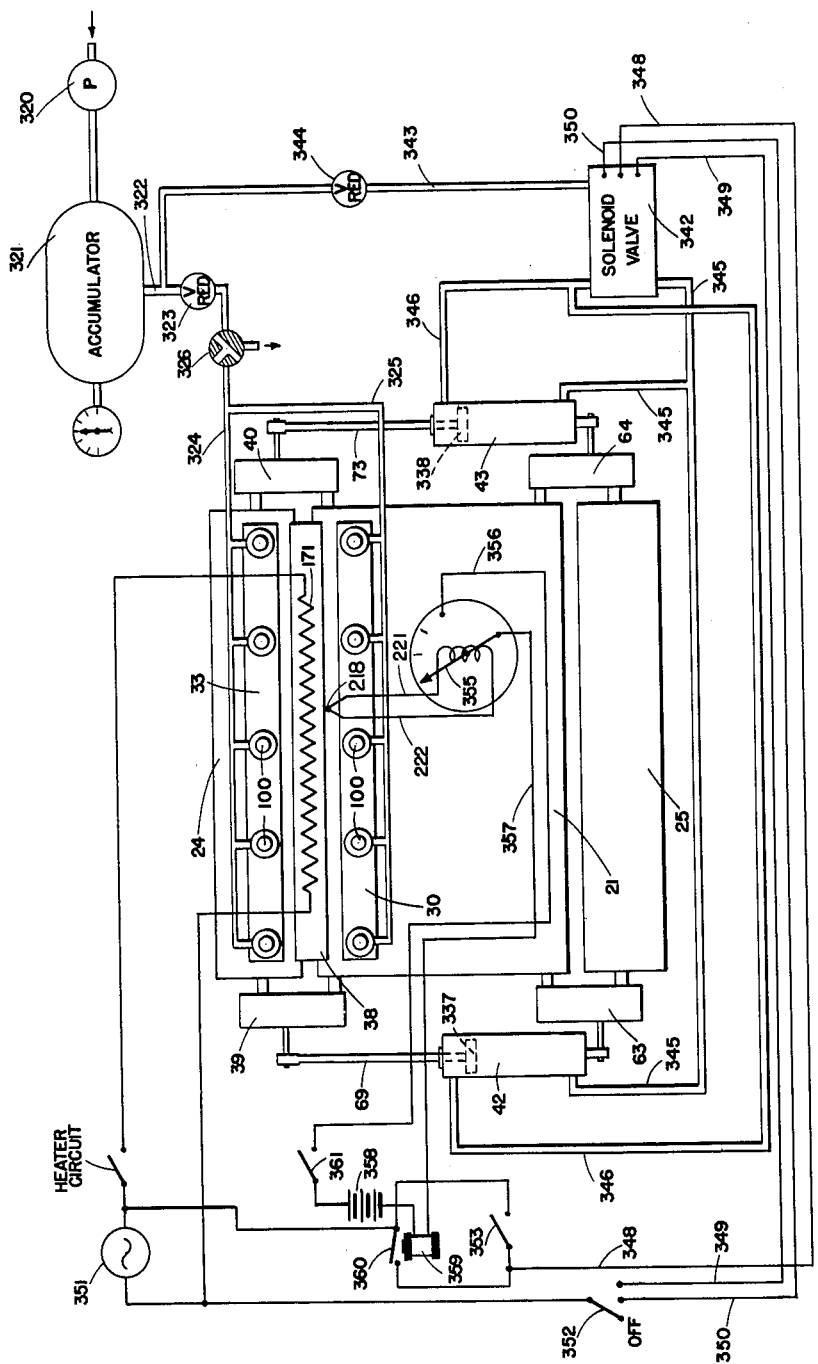

Fig. 33 is a schematic view illustrating the operation of the various elements of the bending machine of this invention.

Figure 1:
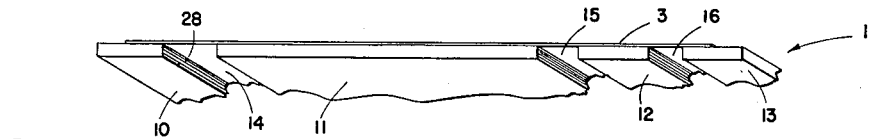
Fig. 1 is a fragmentary perspective view of a workpiece prior to forming.
Figure 2:
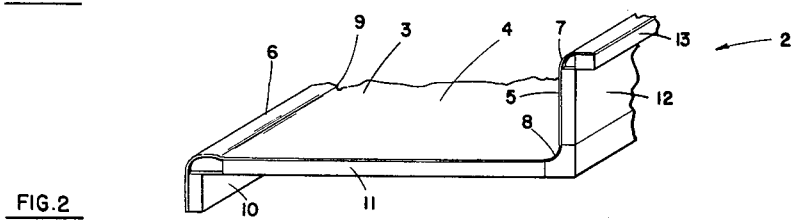
Fig. 2 is a fragmentary perspective view of a completed part.

By the provisions of this invention a workpiece 1, such as that illustrated in Fig. 1, can be transformed to a fully formed sink top 2 shown in Fig. 2. This sink top is provided with a laminated sheet 3 of C-stage thermosetting resinous material which is a postformable material in accordance with the teachings of U. S. Patent No. 2,433,643. The upper surface of this laminated sheet may include a decorative pattern to give the finished article a pleasing appearance. To the under surface of the sheet is attached plywood or other suitable rigid reinforcing material. The finished part includes a main flat surface 4, a backsplash portion 5 and a raised no-drip front edge portion 6. The backsplash includes a simple outside convex bend 7 at the top end thereof and an inside concave bend 8 between the backsplash and the flat surface 4. No-drip or bull-nose edge 6 is an outside convex bend and includes a reverse curvature indicated at 9, which results in a raised edge portion which will prevent liquid on surface 4 from running off the front edge of the drainboard. In order to provide such a part as shown in Fig. 2 a flat sheet 3 of plastic material is attached to reinforcing members 10, 11, 12 and 13 in any suitable manner such as by gluing so that these reinforcing members are in spaced parallelism providing notches 14, 15 and 16 at which locations the sheet 3 of postformable material is unreinforced. These notches provide bending areas for bending portions 6, 8 and 7, respectively, on the finished part. The successive steps involved in carrying out the bends required to form the finished top are illustrated in Figs. 3, 4 and 5. Thus as shown in Fig. 3, bend 6 has first been made about a curved reinforcing member 17 which may be of a wooden strip and in the finished part disposed between plywood sections 10 and 11 so as to form a portion of the completed part. Next, as shown in Fig. 4, outside bend 7 for the backsplash is made around curved reinforcing member 18, and this reinforcing member may be also of wood and end up disposed between plywood sections 12 and 13 as a part of the finished workpiece. Lastly, cove section 8 is bent after which cove member 19 is added and the complete, reinforced, fully-formed drainboard top is completed.

To accomplish this bending, a machine 20 is provided, a top plan view of which is shown in Fig. 6, a side view in Fig. 7, and various details of which are illustrated in the other figures of drawing. The main element of this machine includes a table 21 which has a suitable supporting structure 22 and a flat top 23 on this structure. Additionally, there are provided drop leaves 24 and 25 which have flat top surfaces 26 and 27, respectively. These drop leaves are pivotally connected to the table, and it is by the unique pivoting action of these drop leaves that the various bends illustrated in Figs. 1 through 5 are obtained. The outside or convex bends are accomplished by drop leaf 24, while inside or concave bends are produced by drop leaf 25. These drop leaves are adapted to assume either of two positions. In one position the drop leaf is up with its flat top surface in alignment with the top surface of the table. Drop leaf 24 is illustrated in this position in Figs. 6 and 7. In the other position of the drop leaf it is pivoted 90° downwardly from the up position, being thereby at right angles to table top 23. Drop leaf 25 is shown in the down position in Figs. 6 and 7 of the drawing. The drop leaves also are movable laterally between an extended and a retracted position, and caused to follow an exact path during their pivotal movement, as more fully explained hereinafter.

The general operation of the machine is such that a workpiece may be placed on top 23 of the table and on top of one of the drop leaves where it is held, heated, and bent through an exact predetermined path. As shown in Fig. 6, in which the workpiece is illustrated in phantom for purposes of clarity, workpiece 1 is disposed on table top 23 and on top surface 26 of drop leaf 24. The plywood reinforcing surface is down, engaging the top of the drop leaf and of the table in such a manner that edge 28 of notch 14 is exactly in line with edge 29 of the table top. The portion of the workpiece on table 21 is held firmly in position by hold down means 30. This hold down means comprises a beam having retractable power-operated elements to clamp the workpiece in position, as will be more clearly described below. This beam is movable on tracks 31 and 32 to a suitable position just over the workpiece at which time the clamping means can be actuated to firmly secure the workpiece to the table. A similar hold down means 33 is provided on the drop leaf 24. This hold down means is movable on tracks 34 and 35 so that it can be suitably positioned over the portions of the workpiece on the drop leaf and the clamping means then actuated to firmly hold the workpiece in position. Backing members 10 and 13 may extend beyond plastic sheet 3 so that the hold down means can always firmly engage the workpiece.

In the illustration of Figs. 6 and 7 where bend 6 is to be made by the machine, curved reinforcing member 17 is supported adjacent notch edge 28 and table edge 29 by means of a plurality of retractable finger members 37. The machine also includes a suitable heating element 38 which is movable relative to the table top. In Fig. 6 the heater is illustrated in a raised position remote from the workpiece. When the workpiece has been suitably clamped into position, heating element 38 is moved to where it is disposed in heat transfer relationship with notch 14 where the sheet is to be formed, as shown in Fig. 7, so that the unreinforced plastic material of this area may then be heated to a postformable temperature after which the forming operation can take place. Such a temperature should heat the plastic sheet throughout to a temperature in excess of around 250° F. but less than about 350° F. The drop leaf is then pivoted through an exact path relative to the table to the down position at 90° to the position shown in Figs. 6 and 7 of the drawing. This bends material 3 at the location of notch 14 to assume the desired contour. During the bend the pivoted portion is guided so that it follows an involute curve. In order to provide a completely reinforced finished part the width of notches 14 and 16 must be substantially the same as the peripheral width of curved reinforcing members 17 and 18. This enables the edges of the flat reinforcing members to pivot about the edges of the curved members when the bend is complete. Pivotal movement of the drop leaf is accomplished by means of actuating cylinders 42 and 43. As the drop leaf goes down, for producing the reverse curvature 9 of edge 6, an additional forming member 44 is urged against the workpiece to assure that the reverse curvature is imparted to the plastic sheet. The workpiece is then held in this bent position until it is cool, after which time it may be removed without danger of springback. The successive bends are accomplished in a generally similar manner. Drop leaf 24 will provide the outside bend, such as those at 6 and 7, while drop leaf 25 is designed for producing inside bend 8. The details of the construction and operation of the unit as described briefly above will be more clearly brought out hereinafter.

One of the important features of this invention is the manner in which the drop leaves are carried and guided in their pivotal connection to the table. The connection between each of the drop leaves and the table includes a guide means which permits lateral movement of the drop leaf relative to the table during the pivoting of the drop leaf. In the case of drop leaf 24 this is accomplished by means of guide cylinders 39 and 40. The arrangement and action of cylinder 39, which is identical to the construction used for the other cylinders, is best seen by reference to Fig. 8, which is a side elevational view, Fig. 9 which is a top plan view, partially in section, and Fig. 13 which is a side view taken along line 13—13 of Fig. 9, but with the drop leaf shown in a lowered position. Within the interior of guide cylinder 39 is an elongated piston 46 which is reciprocal therein. The drop leaf connects with this guide means through pin 52 which is secured to and carried by the drop leaf, and projects through a slot 53 in the cylinder wall to an opening in piston 46 where it is secured by means of screw 54. Near the other end of cylinder 39 a pin 55 is secured to and carried by the cylinder and projects therefrom toward the drop leaf. The end of pin 55 carries a roller 56 which is movable in a slot 57 in end flange 58 of the drop leaf. In this manner drop leaf 24 is carried by cylinder 39 through reciprocative piston 46 and the roller 56 which runs in slot 57 of the drop leaf end flange. Guide cylinder 39 therefore permits lateral movement of the drop leaf relative to the table. Drop leaf 24 includes suitable reinforcing members 59 and 60 which extend beneath top surface 26 of the drop leaf to another end flange similar to flange 58 on the opposite end of the drop leaf. This second end flange connects with the second guide cylinder 40 which carries the other end of the drop leaf in a manner exactly similar to the connection with guide 39. It is thus far obvious that, by means of the connection through the guide cylinders, the drop leaf is free to move laterally between a remote position where it is extended away from the table and a retracted position where it is more closely adjacent the table edge. The lateral movement of the drop leaf can be limited by the length of the slots or the piston travel.

At the inner end of guide cylinder 39 beyond slot 57 there may be seen the pivotal connection between this guide and the table. For this purpose a stud 61 is secured to the table and extends therefrom, passing through the end of cylinder 39 to which it is suitably secured by means of nut 62. Cylinder 39 is thus pivotally connected to the table by means of stud 61 so that the cylinder rotates about the axis of this stud. Guide cylinder 40 is similarly pivotally mounted on stud 74.

The mounting for drop leaf 25 is the same as for drop leaf 24 so that guide cylinders 63 and 64 carry drop leaf 25 by means of a roller arrangement and by guide pistons within these cylinders. Cylinders 63 and 64 are pivotally connected to the table by means of studs 65 and 66.

Also comprising an essential portion of the connection between the drop leaf table is the means for defining a fixed path through which the drop leaf must travel when pivoted from the up position to the down position at 90° therefrom. For a simple 90° bend of constant curvature, such as that for providing outside convex bend 7 and also for inside concave bend 8. This means comprises a rack and gear arrangement. For drop leaf 25, as may best be seen in Fig. 10, a gear 47 is fixedly carried on the shaft 65 of the table while a rack 48 is fixed to the drop leaf by suitable means such as welding and engages the gear. A similar gear and rack are provided at the opposite end of drop leaf 25. For drop leaf 24 a guide assembly comprising gear 49 mounted on shaft 61 and rack 50 attached to the drop leaf can be seen in Figs. 11, 12 and 13, while its counterpart is disposed at the opposite end of drop leaf 24.

For reasons made more clear hereinafter it is necessary to mount the gears used with drop leaf 24 so that they can be made free for rotation when producing no-drip bend 6. For the normal circular bend as at 7, however, the gears for use with drop leaf 24 do not rotate but are locked on their mounting shafts. The locking arrangement for gear 49 comprises an extension 180 thereof having a top surface 181 which is engageable by a projecting tab 182 of retaining pin 183 (see Fig. 14). This retaining pin is slidably secured in a block 184 which is fastened to the table, and the pin is movable by means of a small projecting handle. When the retaining pin is moved to a position such as shown in Figs. 11 through 14, the tab portion thereof engages the extension of gear 49 and will prevent its rotation relative to shaft 61.

When the drop leaf is pivoted from the raised position to the lowered position the rack and gear assemblies cooperate to define the path which the drop leaf must follow during its pivotal movement. This path must necessarily be a 90° segment of the pitch circle of gear 49. As the drop leaf is so moved it will be caused to move laterally toward the table as the rack rides on the gear. It can be seen by reference to Figs. 11 and 13 that when the rack engages the gear in the up position of the drop leaf the teeth thereof at end 185 of the rack are in engagement with the gear. When the drop leaf is lowered the teeth at the opposite end portion 186 of the rack engage the teeth of the gear. This movement is permitted because of the connection in support through the means of guide cylinders 39 and 40 as described above. Therefore, the guide cylinders, plus the rack and gear arrangements, positively and precisely control the path of the travel of the drop leaf between its raised and lowered positions along the pitch circles of the gears attached to the table. The path followed by the drop leaves relative to the table during their pivotal movement is thus generated along the curvatures of the gear pitch circles, which means that the drop leaves are caused to follow an involute path generated from these curves. Obviously, the pitch circles of the gears must be made to correspond exactly to the desired curvature of bend which, in the case of the outside bend 7, is the same as the curvature which obtains along the curved surface of reinforcing member 18. The movement of drop leaf 25 with its similar gear and rack arrangement is the same as that for drop leaf 24 described above, and the pitch circle of the gears for drop leaf 25 must be such that reinforcing member 19 may be subsequently added to the under side of the completed article.

The kinematics of the drop leaf are illustrated in Fig. 15. As shown in solid lines in this figure, drop leaf 24 is in the raised position. When in this raised position rails 34 and 35 of the drop leaf are adjacent rails 31 and 32 of the table and the drop leaf is maintained in this position by reason of the meshing engagement between the racks and gears. Roller 56 which is attached to guide cylinder 39 is therefore in the right hand side of slot 57 in the end flange of the drop leaf. The workpiece is secured in place with the drop leaf in this position. The axis of the curvature of the predetermined path followed by the portion of the sheet which is to be bent is along a line perpendicular to point A which is also the center of curvature of reinforcing member 18, shown in this figure in position for the bend. Point B represents the edge of plywood sheet 12 at notch 16. If there were no provision for allowing lateral movement of the drop leaf relative to the table during the pivotal movement of the drop leaf point B would be caused to rotate about a radius extending between points B and A. There is not sufficient unreinforced plastic at the location of notch 16 to allow this path to be followed so that if the drop leaf merely pivoted about such a radius the unreinforced plastic material would be torn in two at the location of the notch.

However, by the provisions of this invention whereby the drop leaf is shifted laterally during its pivotal movement pathway Y is followed by point B as the drop leaf is moved to the lowered position. This is despite the fact that the notch width substantially equals the peripheral width of the curved reinforcing member surface. By following such a path it will be noted that point B clears the edge of member 18 and ends up at point A. Similarly point C follows pathway Z so that at the conclusion of the bend plywood backing member will be abutting edge 152 of the curved reinforcing member. Plastic material 3 will be given the exact curvature of the surface of member 18 and will not be pulled apart or otherwise damaged. By reason of the gear and rack arrangement practically no force is exerted against member 18 although the plastic material will be given the exact contour thereof. Actually the part could be made as well if member 18 were eliminated, but it is of course desirable to have this member between back-up sheets 12 and 13 so as to form an additional reinforcement for the completed article.

Note that when the bend is completed, as illustrated in phantom in Fig. 15, roller 56 has been moved to the opposite end of the slot from the position illustrated in solid lines. Thus, it can be seen that the drop leaf was moved toward the table a distance corresponding roughly to the length of the slot as the bend progressed. Therefore, it is obvious that the drop leaf was caused to follow an involute curve as the material at the location of the notch was given a curvature corresponding to that of member 18.

For the no-drip or bull-nose type bend 6, a somewhat different path from that for bend 7 or 8 must be followed by the plastic material at the location of the notch. The path is still an involute and is generated on the curve corresponding to the surface of curved reinforcing member 17, but it does not have a fixed radius. Therefore, it is impossible to utilize a gear and rack arrangement for providing this curve and a different means must be employed to positively guide the drop leaf relative to the table. For this purpose a cable guide arrangement is utilized, the cable arrangement for one side of drop leaf 24 being illustrated in Figs. 9, 11, 12 and 16. The other cable guide assembly at the opposite end of drop leaf 24 is identical. Block 184, rigidly secured to the table, includes an upstanding flange 187 which threadably receives hollow screw members 188 and 189. The drop leaf is also provided with a block 190 suitably attached thereto. Cables 192 and 193 interconnect the two blocks. These cables pass through openings 197 and 198 in block 190 and are retained in engagement with this block by enlarged ball ends 204 and 205. The other ends of the cables pass through hollow screws 188 and 189, and ball ends 206 and 207 engage the ends of the screws. Therefore the cables limit the possible lateral movement of the drop leaf away from the table edge.

Block 208, attached to the table adjacent block 184 includes two grooves 209 and 210 which are adapted to receive the cables when the drop leaf is moved to a lowered position. These grooves are made to accurately define the exact curvature which is to be imparted to the no-drip edge of the plastic sheet.

Therefore, when forming a no-drip type edge, pin 183 is moved so that its interfering detent tab 182 no longer engages end 180 of gear 49. This means that the gear in rack will no longer define the path which is to be followed by the drop leaf in its subsequent movement because the gear is free to rotate and will not confine the movement of the rack. Accordingly, when the drop leaf is lowered cables 192 and 193 will wrap around the block 208 in the grooves 209 and 210 whereby the drop leaf is caused to follow the exact contour defined by the grooves.

In order that the cables 192 and 193 may be maintained taut prior to the lowering of the drop leaf in forming the part so that there will be an accurate contour followed as the cables wrap up in the grooves, a spring 211 is provided inside guide cylinder 39 engaging guide piston 46 as best seen in Fig. 9. A similar spring arrangement is provided inside guide cylinder 40. These springs urge the guide pistons to the extreme ends of the cylinders and therefore tend to force the drop leaf away from the table edge. This force maintains cables 192 and 193 under a slight tension so that they are taut prior to the forming operation. Of course the force which urges the drop leaf away from the table is all absorbed in the cables and will not be taken up by the workpiece clamped thereto.

It is also important that the cables are maintained with equal tension thereon so that each cable does its part as a guide means. The cables must be of a proper length so that the drop leaf is positioned properly relative to the table edge prior to the forming, and the accurate contour will be followed. For this reason, the cables are adjustable which is accomplished by the attachment to block 184 by means of the hollow threaded screw members 188 and 189. It is a simple matter to properly set the length of each cable by rotating its attaching screw in one direction or the other.

As pointed out above, the actuating force for pivoting the drop leaves comes from cylinders 42 and 43. The arrangement for cylinder 42, which is identical to the arrangement for cylinder 43, may best be seen in Figs. 7, 8 and 9. One end of cylinder 42 is pivotally connected by pin 67 to bracket 68 which in turn is attached to cylinder 63. A rod 69 extends from the other end of the cylinder and connects by means of pin 71 with a similar bracket 70 attached to cylinder 39. On the other side of the machine cylinder 43 is attached to bracket 72 of cylinder 64, and piston rod 73 extends from the cylinder and pivotally attaches to the bracket of tensioning cylinder 40. Cylinders 42 and 43 are the ordinary pneumatic type in which a piston is reciprocal and operates the piston rod.

In order to operate drop leaf 24, drop leaf 25 is first pivoted to the lowered position illustrated in Fig. 7 and locked in this position. Locking of this leaf is accomplished by means of a slidable lock member 75. An identical lock 76 is provided for drop leaf 24, a detail of which is shown in Fig. 17. These locks may consist simply of a section of a U-shaped channel 77 having a slot 78 therein. Threaded screw 79 freely passes through the slot of lock member 77 and is received in bracket 80 which is attached to frame 22. Member 77 may be slid over the top surface of the drop leaf when the drop leaf is down, and tightened in position by means of screw 79 which has an enlarged boss 81 that engages portions of slide 77 around the slot therein. When the lock is thus held over the top of the drop leaf it is impossible to move the drop leaf to a raised position. A similar lock arrangement may be provided on the opposite side of each drop leaf so that there is uniform holding action. Furthermore the bottom surface of a lowered drop leaf engages a pad 82 which is attached to the frame and prevents any further pivotal movement. Each of members 82, therefore, acts as a stop means for a drop leaf when it is pivoted downwardly and limits the travel thereof to 90° when this is the desired curvature for a bend.

After drop leaf 25 has been locked in the down position, drop leaf 24 may be pivoted relative to the table to the down position by retracting piston rods 69 and 73 to a position further within cylinders 42 and 43 which pulls the drop leaf downwardly. The actuating cylinders themselves will not move as the rods are retracted because of their attachment to locked drop leaf 25.

Prior to the downward pivoting of the drop leaf it is of course necessary to position the workpiece on the table and the drop leaf, and to clamp it in place. For clamping the workpiece in place for a bend by means of drop leaf 24, hold down means 30 and 33 are slid on tracks 31 and 32, and 34 and 35, to a desired position above the workpiece, as discussed briefly above. Both ends of each of these beams are mounted on rollers so that they may slide readily along the rails. For example, hold down means 33 may include a relatively light sheet metal cross beam 83 which has at its ends identical roller units 84 secured to the beam by any suitable means such as by welding (see Figs. 18 and 19). Each of these roller units includes a housing 85 the bottom portion of which has flanges 86 and 87 adapted to fit beneath flanges 88 and 89 of the rails. Two rollers 90 and 91 are carried by pins 92 and 93 within housing 85. These rollers are free to rotate relative to the housing and rest upon the rails. The rails for this beam preferably should include a raised central portion 94 and the rollers should be relieved at the center, as indicated at 95, so that they have generally an hourglass shape designed to fit on the rails. This type of provision for the rails and the contour of the rollers will serve as extra guide means for the beam so that it may be readily rolled along the rails from one end of the beam without danger of twisting or binding on the rails. This provision greatly adds to the convenience of positioning the beam over the workpiece. A locking means is provided so that the beam will be firmly held in the desired position once it has been located. For this purpose a set screw 97 is threadably received in each roller housing 85 and by tightening a knob 98 may be forced against the top portion 94 of the rail. This will cause flanges 86 and 87 of the roller housing to engage the underneath side of flanges 88 and 89 of the rail thus firmly locking the beam in position. The rollers and locking arrangement for the other hold down beams are exactly as illustrated and described for beam 30 for which reason corresponding parts have been given identical reference numbers.

The actual locking action by the beam in holding the workpiece may be provided by a plurality of cylinders 100 secured to the beam in a suitable manner such as by brackets 101 to cross members 102 which are attached by rivets to the sides of the beam (see Figs. 19 and 20). Hold down cylinders 100 include ordinary pneumatically operated pistons 103 reciprocal in the interior thereof, and a rod 104 is carried by each piston and projects from the cylinder. Rod 104 carries a pad or foot 105 at the bottom thereof. Each pad 105, in turn, bears against a bottom channel member 106 so that when air pressure is introduced into the interior of the hold down cylinder, a force is exerted through the piston 103, rod 104, foot 105, and channel member 106 to the workpiece beneath the beam. The channel member serves to distribute the force along the workpiece and it is provided with a protective coating of a suitable material 108, such as cork, on the under surface thereof so that there will be no damage to the workpiece from the hold down means. These hold down cylinders, in forcing the workpiece against the table or against the drop leaf, firmly position the workpiece so that it is rigidly held and will not move during the bending operation.

Channel 106 is biased upwardly by means of a plurality of springs 109 which are suitably secured to the bottom of channel 106 by any means such as brackets 110 and are attached to the top of the beam by lugs 111. Thus if there is no air pressure within the hold down cylinders, springs 109 will move channel 106 upwardly off of the top of the workpiece. This assures that the beam or the workpiece may be moved freely and that the workpiece is not locked until air pressure is introduced into the cylinders so as to force the channel downwardly.

It is possible to construct the beam out of light sheet metal section as illustrated because of the tensioning provisions for the beam. This is supplied by means of a tension rod member 113 which extends over the top of the beam and on its under side engages vertical bracket 114 which is carried by the upper surface of the beam. This bracket is disposed at the central portion of the beam so that rod member 113 has a slight angle upwardly from the ends toward the center of the beam. Each end of rod 113 is threaded and passes through an opening in a fitting 116 to which it is secured by means of a threaded nut 117. Each fitting 116 is pivotally carried by a bolt 118, connected with links 119 and 120 which are pivotally carried at their other ends by bolt 122 which is mounted on the beam. It is possible by this arrangement of the rod member 113 to exert a downward force from the top of the beam to counteract the upward force which the hold down cylinders will exert when air pressure is introduced into the hold down cylinders. Thus if nuts 117 are tightened to shorten rod 113 a large downward force will be exerted through bracket 114 which will tend to bend the beam in the opposite direction from the bending action which will be produced by the hold down cylinders. Normally by these provisions an initial tension is given to the beam by means of rod 113 so that subsequent loading by the hold down cylinders will not cause the beam to bow upwardly.

It should be noted that tracks 31 and 32 of the table exactly match tracks 34 and 35 of drop leaf 24 when that drop leaf is in a raised position. Similarly tracks 31 and 32 meet tracks 125 and 126 of drop leaf 25 when the latter drop leaf is in a raised position. Both beams are thereby made movable to any position on the machine. When forming is taking place with drop leaf 25, and drop leaf 24 is in the down position, beam 30 may be rolled to a position on drop leaf 25 for holding down the portion of the workpiece on that drop leaf and beam 33 may be rolled to a suitable position on table 21 for holding a portion of the workpiece on the table.

For forming with drop leaf 24 when the beam has been suitably positioned and the workpiece has been firmly locked in place it is necessary to support a curved reinforcing member adjacent table edge 29. For bend 6 the curved reinforcing member must be within notch 14 adjacent edge 28 of the rigid backing member. The function of holding these reinforcing elements is carried out by finger members 37, the detail arrangement of which is shown in Figs. 21–25. These members automatically extend to the position shown in Fig. 22 when drop leaf 24 is in a raised position for thereby supporting a die, and will automatically retract when the drop leaf is lowered. This feature is very important because, together with the unique attachment of the drop leaf to the table, it enables the production of a fully-formed reinforced drain board top or the like wherein the curved reinforcing member has become an integral part of the completed article. These members serve as reinforcement at the location of an outside bend and will abuttingly engage adjacent rigid backing members attached to the decorative sheet. For each finger a housing 128 is suitably secured to the table structure by means of screws 129 and 130. A movable element 131, having preferably a rounded contour as illustrated, is slidably received within housing 128 and serves when extended to support the die member. A second movable element 132 is included with member 131 and is slidable relative thereto. Slidable element 132 is provided with a slot 133 which receives a pin 134 secured to member 131. An aperture 135 may be provided in member 132 whereby manual movement of this member relative to element 131 is facilitated. When element 132 is in its retracted position relative to element 131, a portion of the top of element 131 is exposed which serves as a support for a reinforcing member 17 of the type for a no-drip type of bend. Such a member, by including a reversely curved portion, is of a greater thickness than a member 18 which reinforces a normal waterfall outside bend. Member 18 may be merely a quarter round section of wood, accounting for its decreased thickness. Therefore, when element 132 has been slid to its extended position this element serves to support quarter round member 18. For either type of curved reinforcing member, the finger members will provide a firm support at the proper location adjacent edge 29 of the table top.

As drop leaf 24 pivots, element 131 is automatically moved by means of a cam arrangement, so that the fingers are retracted when the drop leaf is lowered. A cam member 137 projects through a slot 138 in housing 128 so that it may engage member 131 within cylindrical aperture 140. Cam 137 terminates in a ball portion 141 which has a radius substantially the same as the radius of aperture 140. Because of this ball 141 will be in engagement with the walls of aperture 140 no matter what the relative position of the cam and member 131 may be.

Cam 137 is rigidly mounted on a shaft 142 so that it will rotate with this shaft. It is apparent thus far that when shaft 142 has been rotated so as to cause cam 137 to assume the position of Fig. 22 element 131 will be extended for supporting member 17. When cam shaft 142 is subsequently rotated so that the cam assumes the position of Fig. 23, element 131 will be withdrawn so that member 17 will no longer be held by the finger member. This enables plywood backing member 11 to assume a position abuttingly engaging the lower edge of reinforcement 17 while the decorative plastic material is formed to a curvature corresponding to that of member 17, and backing member 10 contacts the other edge of member 17.

Cam shaft 142 is automatically rotated when the drop leaf moves by a linkage which may be best seen in Figs. 8 and 9. Cam shaft 142 is rotatably carried by the table by suitable bearings 143. The end of shaft 142 is provided with a crank 145. Pivotally connected to this crank is a link 146 which connects with bellcrank 147. The opposite end of bellcrank 147 pivotally engages link 148, while the bellcrank is pivoted at 149 to the table structure. Link 148 extends forwardly to cylinder 39 to which it is attached by a bolt 150. By this linkage, when cylinder 39 is pivoted downwardly by means of actuating cylinder 42 to lower the drop leaf, bolt 150 will be moved generally to the left of the position shown in Fig. 8 which will cause crank 145 to move to the right and will effect rotation in a clockwise direction of cam shaft 142. The pivot point of link 148 and of cylinder 39 are arranged relative to each other so that most of the movement of cam shaft 142 and thus members 131 will occur when the drop leaf is nearing its lowered position. Location of bolt 150 below stud 61, about which cylinder 39 pivots, gives this result by appreciably moving bolt 150 to the left only when cylinder 39 has pivoted a considerable distance. By this arrangement the fingers are withdrawn only when the drop leaf has almost completed the bending operation and when the plywood reinforcing members can extend beneath the curved reinforcing member to support it as the fingers are withdrawn. Fig. 25 illustrates this action showing how member 131 is retracted in such a manner that the backing material will support the curved reinforcing member as soon as the support of the finger elements is removed. In this figure member 18 is shown supported on the fingers, but the action is substantially the same, of course, when member 17 is being used.

As a modification of this invention it is possible to form the outside bends, such as bend 6 or 7, without the use of the finger elements 37 described above. Elimination of these fingers considerably simplifies the construction of the machine. Of course, it is essential that the reinforcing element for the bent portion of the workpiece be held adjacent the reinforcing member disposed on the table so that it will be in the proper position when the bend is completed. As shown in Figs. 26 and 27 a spline arrangement is provided to achieve the function of holding member 17 adjacent to member 10. The edge of member 10 may be recessed, and one side of member 17 similarly recessed so that spline 212 can be fitted within these recesses and hold the member 17 in its proper position. Because of the fact that the bent portion of the plastic material is caused to follow an exact, predetermined path there will be practically no load on member 17 during the bend so that additional holding means are not necessary for this member. Also, in order to obtain a more rigid and unitary structure when the bend is completed, members 17 and 11 may be provided with complementary notches 213 and 214 so that an overlapping joint is obtained when the drop leaf is lowered. Then a screw 215 may simply be threaded into the joint, which will firmly hold member 17 to member 11 and a unit of great strength and rigidity obtains.

As a modification of this interlocking arrangement for holding the reinforcing member in place, member 17 may be provided with an extension 216 while member 10 is notched complementary thereto. Member 17 is merely hooked over member 10 by means of this extension prior to the bend which will hold it in place during the bending operation. This is even simpler to carry out than the modification of Figs. 26 and 27 where a spline arrangement is used. Of course, the interlocking arrangement applies exactly in the same manner to reinforcing member 18.

The edges of reinforcing members 17 and 18, as well as the curved surfaces thereof, are coated with a suitable adhesive prior to the bend so that they will be firmly held in engagement between the plywood backing member when the bend is completed. In many instances the reinforcing member will be glued to the edge of the backing member which rests on the table prior to the bend as a matter of convenience in handling.

As mentioned briefly above, when the bull-nose or no-drip edge 6 is formed an auxiliary forming means 44 is employed. Forming means 44 cooperates with the cable guide arrangement to provide a fully reinforced reversely curved edge. The cables support the drop leaf and control its path throughout most of its movement, while the auxiliary forming means 44 urges the bendable plastic material into engagement with the reversely curved portion of member 17. For this purpose a rigid beam 155 is provided, extending across the machine. The details of this beam are best seen in Figs. 8, 18 and 29. The ends of this beam are rigidly secured to brackets 156 and 157. Extending across the upper side of the beam is a tension rod 158 bearing against bracket 159 at the center portion of the beam. When the threaded ends of rod 158 are tightened up by nuts 160 and 161 a downward force will be exerted on the beam in the same manner as for the hold down beams thus enabling the use of a light construction. Across the face of beam 155, opposite from rod 158, is a flexible rubber pad 162. Brackets 156 and 157 are pivotally secured to drop leaf 24 by means of pins 163 and 164. These pins include handles 165 and 166 and are of the quick-release pull-out type so that when the conventional rounded edge is being formed instead of the reversely curved type, forming means 44 may be easily removed from the machine.

When the drop leaf, with forming means 44, is pivoted to its lowered position the free bottom ends of brackets 156 and 157 will engage stops secured to the table structure. Thus as shown in Fig. 18 end 167 of bracket 156 engages stop 168 which comprises a screw threaded into bracket 169 of the table structure. This screw-threaded arrangement provides for adjustment of the location of stop 168. When the free ends of the brackets engage the stops as the drop leaf goes down, this pivots the brackets about pins 163 and 164 causing the top ends of the brackets, where the beam is located, to be urged inwardly toward the workpiece. As a result pad 162 engages the plastic material at the location of the reversely curved portion of reinforcing member 17. This causes the plastic to be forced into intimate contact with this portion of member 17 so that sheet 3 will be reversely curved and the no-drip type of edge will be produced and will at the same time be rigidly reinforced at all portions thereof. The adjustable stop of course will enable controlling the amount of force exerted by rubber pad 162 by governing the travel of beam 155 toward the workpiece. If desired pad 162 could be replaced with an auxiliary die member having a contour complementary to the reversely curved portion of the finished part which would then urge the plastic into engagement with member 17 but it has been found simpler to utilize a rubber pad as described.

For heating means 38 a suitable heater has been found to be an infrared resistance type heater having resistance element 171 with a reflector 172 as shown in Figs. 7 and 8. This type of heater will provide a localized intense heating of the type required so that the bendable portion of the plastic may be heated to a postformable temperature, i. e., about 250° F. to 350° F. Heater element 38 is pivotal relative to the table so that it can be used to heat the bendable portions of the workpiece for a bending operation by drop leaf 24 or by drop leaf 25. As shown in Fig. 6 the heater unit is disposed in a raised, neutral position with the actuating linkage for the heater not shown. The linkage whereby the heater may be held in heat transfer relationship with the workpiece and automatically removed from such relationship when the workpiece is bent can best be understood by reference to Fig. 7. By this arrangement the heater element is held by a suitable bracket 174 and is pivotal relative to a beam 175 which acts as a support for the heater element. Beam 175 is pivoted at 176 to the central portion of the table. A spring 177 is connected to the bottom of beam 175 and is fixed to the table at the other end by pin 178 disposed beneath mounting pin 176 of the beam. The spring counteracts the weight of the heater and urges beam 175 to a vertical or raised position. Pivotally attached to beam 175 above point 176 is a connecting link 179 which is in turn pivotally connected by pin 195 to tensioning cylinder 39.

When the drop leaf 24 is pivoted downwardly in a forming operation the heater linkage will move to the vertical position shown in phantom in Fig. 7. This results because link 179 is moved generally to the right by the tensioning cylinder as the latter is pivoted through its 90° arc. Link 179 therefore pushes on heater support link 175 above the pivot point thereof and moves link 175 to a raised position. Heater resistance element 171 is in this manner moved to a position remote from the table and the drop leaves, and can cause no damage to the workpiece or interference with removal of the workpiece from the machine. Preferably link 179 is designed as a telescoping member so that when the drop leaf is subsequently raised after the forming operation has been completed and the workpiece removed, the link will elongate and will not draw beam 175 downwardly, and therefore will not bring the heater into heat transfer relationship with the workpiece. This will enable properly positioning the workpiece on the table and clamping it in place without danger of premature heating of the workpiece. When the bendable area of the workpiece is to be heated, beam 175 is manually drawn down to the position where it is in heat transfer relationship with this bendable portion of the workpiece. The link 179 is thus designed so that it will slip in the direction which would extend the link but will hold as the link pushes upwardly on the heater mounting beam 175. By manual operation it may be contracted for positioning the heater.

The detailed design of this telescopic link is shown in Fig. 30. As illustrated in this figure link 179 includes a central bar member 262 which connects at one end to tensioning cylinder 39 by pin 195, and extends slidably into a second link 263 of rectangular cross section. Link 263 is pivotally connected at 264 to the main heater support link 175. A portion of the top of link 263 is open as at 266 which gives access to teeth 267 formed in the top of bar 262. A bracket 268 connected with link 263 pivotally mounts pawl 270 which is forced by spring 271 into engagement with teeth 267. The telescoping provision of link 179 thus comprises a simple ratchet arrangement whereby links 262 and 263 can extend as pawl 270 slips on teeth 267, but which will form a non-slipping connection in the other direction as pawl 270 holds against teeth 267. Of course pawl 270 can be released against the force of spring 271 when it is desired to shorten link 179 in bringing the heater to its lowered position in heat transfer relationship with the bendable portion of a workpiece on the machine.

When it is desired to form on drop leaf 25 instead of drop leaf 24, pin 195 which connects link 179 to tensioning cylinder 39 can be removed and inserted in an opening 196 in the outer wall of cylinder 62. This opening corresponds in location to the position where pin 195 was mounted in cylinder 39. The action of the heater linkage in automatically removing the heater from the location of the workpiece will then be exactly the same as described for drop leaf 24.

For use in providing the cove or inside bend 8 a round bar 201 extends along edge 20 of the table on the side of drop leaf 25 (see Fig. 31). Bar 201 has a radius corresponding to the radius of bend 8. This bar is not absolutely necessary because the contour of bend will be determined by the gear and rack assemblies as described above. However, bar 201 will act as a safety provision to assure that each portion of the bendable area of the workpiece will be given exactly the required shape. This bar rests in a substantially U-shaped channel 202 to which it is firmly held by suitable means such as a plurality of screws 203. Channel 202 is in turn rigidly secured to the table structure. The forming of the cove bend is quite similar to the forming of the outside type of bend by the drop leaf 24. For forming with drop leaf 25 the workpiece is positioned with a bendable area adjacent die 201 and clamped in place by means of the hold down means 30 and 33 as described above. However, for the cove type of bend the decorative plastic sheet will naturally be located adjacent the table top and the top of drop leaf 25 with notch 15 facing upwardly. The plastic material of notch 15 is then heated by the heater, and bent by the actuating cylinders as was the case for drop leaf 24. Of course when postforming on drop leaf 25, drop leaf 24 will be placed in the lowered position and held in this position by locking means 76. This anchors actuating cylinder piston rods 68 and 69, and allows the actuating cylinders to move in response to pressure therein, thus pivoting drop leaf 25.

When a bend has been completed, removal of the workpiece from the machine is simplified by a pivotal connection of the tracks of the drop leaves. This arrangement is best seen in Fig. 13. Track 34 is illustrated in this figure and the other tracks on the drop leaves are held in a similar manner. The outer end of track 34 is pivotal about mounting bolt 227. The inner end of the track is held to flange member 58 by means of an easily removable pin 228 having handle 229. When a bend has been completed, the pressure exerted by the hold down means associated with the beam may be released, following which pin 228 is removed by means of handle 229. The pin for track 35 on the opposite side of the machine is removed in a similar manner. The tracks are then pivoted about their mounting pins—227 for track 34—to the position illustrated in phantom in Fig. 13. When in this position the workpiece may be easily removed from the drop leaf without interference from the beam. To prevent the track and the beam from pivoting too far downwardly a projecting tab 230 extends from the track 34 and when the track is pivoted outwardly from the drop leaf to the position shown this tab will interferingly engage member 58 preventing further pivotal movement of the track.

For a postforming operation such as taught in Patent No. 2,433,643, it is important that the material be bent only when it is within a critical temperature range taught therein, being above 250° and below about 350° F. This machine provides a means whereby the bend is always made when the proper temperature is achieved. For this reason there is a temperature sensing unit 217 as best seen in the detail showing of Fig. 32. This temperature sensing element may be simply a thermocouple arrangement 218 mounted beneath a ceramic head 219. The ceramic head may be in turn, carried on a piece of spring steel wire 220 attached to the movable channel 106 of beam 30, or any other convenient mounting means. Thermocouple leads 221 and 222 extend from the ceramic head for actuating the device as will be more clearly brought out hereinfter. The ceramic head serves to shield the thermocouple contacts from the direct heat from the radiant heater so that only the temperature of the material will be recorded. This ceramic head is made quite small so that any shielding of the material by the ceramic head will be negligible. The spring steel mounting arrangement 220 on channel 106 means that the thermocouple is always pressed against the sheet with the same pressure so that an accurate and uniform reading will be obtained in every instance.

The means for actuation of the various elements of the machine are illustrated in schematic Fig. 33. Although the various members used in applying forces for holding and bending the workpiece may be any desired type, in the preferred embodiment these are pneumatic cylinders. Therefore, for operating these pneumatic cylinders an air compressor 320 is connected to an accumulator 321 for delivering a supply of air at a substantially constant pressure. This accumulator connects to the supply lines leading to the various cylinders of the machine. Thus manifolds 324 and 325 branch off of line 332 and serve hold down cylinders 100. The control of these hold down cylinders for clamping a workpiece on a machine is obtained through actuation of three-way valve 326. This valve may be turned so as to admit air through lines 324 and 325 or may be turned to close off this air supply and to bleed the air from within the hold down cylinders so as to release the workpiece. Pressure reducing valve 323 in line 322 enables control of the force exerted by the hold down cylinders.

Control of actuating cylinders 42 and 43 is accomplished by means of a solenoid valve 342. This valve receives air pressure through line 343 which includes a pressure governing valve 344. Valve 342 is a three-way valve so that pressurized air may be admitted through line 345 to one side of the cylinders for actuation in one direction or through line 346 to the other side of the cylinders for actuation in the opposite direction. These actuating cylinders are of course a simple type in which rods 69 and 73 connect with pistons 337 and 338 inside the cylinders. Air on one side or the other of the pistons will move the pistons and the rods in one direction or the other. Conductors 348, 349 and 350 connect solenoid valve 342 with a source of electrical energy 351. Main switch 352 is a three-position switch and can disconnect both of conductors 349 and 350 or connect these conductors individually to the source of electric energy. This is required because solenoid valve 342 is a three-way valve and connection of one of the wires will cause the solenoid to operate in one direction and the other wire will cause it to operate in the other direction. Conductor 348, through switch 353, also connects with the source of electrical energy to complete the circuit. When switch 353 is manually operated, actuation of the solenoid valve will take place in one or the other direction depending on which of wires 349 and 350 is connected with the valve for operating the actuating cylinders as desired.

In the preferred embodiment there is a provision for automatically operating the actuating cylinder in addition to the manual switching arrangement through switch 353 as just described. This automatic arrangement is obtained through the thermocouple unit 217 described above. Thermocouple element 218 as illustrated in Fig. 33 is associated with a movable contact element 355 which will be moved angularly in accordance with the amount of current flowing through the thermocouple lead wires and thus in accordance with the temperature of the workpiece as sensed by the thermocouple. When a predetermined temperature has been reached, which is suitably calibrated to be a temperature within the postforming range, arm 355 closes the circuit to conductor 356 so that current may flow through conductors 356 and 357, by reason of a suitable source of electrical energy 358. Relay 359 is included in this circuit and when current therein flows through the relay, contact 360 will be closed thus allowing current to flow from the main source of electrical energy 351 to conductor 348 and thus to the solenoid valve to cause automatic operation thereof. Switch 361 in the thermocouple circuit will enable that circuit to be cut out for manual operation of switch 353. Of course, if desired, the thermocouple element may be additionally or alternatively connected with suitable gages or dials which will give a visual direct reading of the temperature of the workpiece as sensed by the thermocouple.

It is obvious from the above description that I have provided a means whereby a fully formed reinforced finished part such as that illustrated in Fig. 2 may be quickly and easily produced from a workpiece such as that illustrated in Fig. 1. The workpiece may be accurately positioned on the machine for a bending operation and is firmly held in place by means of the movable hold down means which can move to a position over the workpiece on either of the drop leaves and on the table. The heater element then heats to a postformable temperature only the portions of the workpiece to be bent at the location of the notch. The drop leaves are arranged with a connection whereby a guided involute curve is followed during the bending and the proper relationship is assured between the die and the rigid reinforcing members attached to the plastic.

Certain modifications may be made in the details of the method and means set forth without departing from the basic underlying invention. The foregoing detailed description, therefore, is to be clearly understood as given by way of illustration and example only, the spirit and scope of this invention being limited only by the appended claims.

I claim:

1. A device for forming a sheet of postformable reinforced material having spaced unreinforced portions, said device comprising a first fixture for receiving and holding portions of said sheet on one side of an unreinforced portion, so as to leave said unreinforced portion unconstrained thereby; means for supporting a curved reinforcing member adjacent said unreinforced portion; a second fixture for receiving and holding portions of said sheet on the other side of said unreinforced portion; means for heating said unreinforced portion to the approximate range of 250° F. to 350° F.; and means for moving said second fixture relative to said first fixture through an exact predetermined path having a contour such that said unreinforced portion is caused to assume the contour of said curved reinforcing member.

2. A device for forming a sheet of postformable reinforced material having unreinforced bendable portions comprising a first fixture for receiving and holding portions of said sheet with a bendable portion thereof projecting beyond and adjacent either of two opposite sides of said fixture; heater means adjustable to assume a position of heat transfer relationship with a bendable portion at either of said opposite sides, for heating such a portion to the approximate range of 250° F. to 350° F.; two additional fixtures disposed one adjacent each of said opposite sides of said fixture, each of said additional fixtures including means for receiving and holding portions of such a sheet projecting beyond a bendable portion thereof when said sheet is held by said first fixture; and means for positioning each of said additional fixtures relative to said first fixture so that each additional fixture is caused to follow a fixed curvilinear path of such a contour that a heated bendable portion of said sheet is caused to assume a predetermined bent configuration.

3. A device for forming a sheet of postformable reinforced material having unreinforced bendable portions comprising a fixture for receiving and holding a first reinforced portion of said sheet; a second fixture adapted for receiving and holding a second reinforced portion of said sheet with an unreinforced bendable portion of said sheet disposed between said fixtures; heater means for heating said unreinforced portion to the approximate range of 250° F. to 350° F.; means for supporting a curved reinforcing member adjacent said unreinforced portion of said sheet; and means for moving said second fixture through a fixed path relative to said first fixture, said means being constructed so that said second fixture follows an involute curve generated on the surface of said curved reinforcing member so that said unreinforced portion of said sheet is given the contour of said curved member.

4. A device for forming a sheet of postformable material having a bendable area comprising a first fixture for receiving and holding portions of a sheet of such material adjacent said bendable area on one side thereof with said bendable area unconstrained thereby; means for supporting an elongated curved member adjacent the bendable area of a sheet so held; means for heating said bendable area to the approximate range of 250° F. to 350° F.; and means for pivoting portions of said sheet adjacent and on the other side of said bendable area through a path defined by an involute curve generated on said elongated curved member for thereby imparting the contour of said elongated curved member to said bendable portion, and further operable for holding said sheet so bent until cool.

5. A device for bending a sheet of postformable material having spaced reinforced portions, said device comprising table means for holding a reinforced portion of such a sheet, drop leaf means for holding a second reinforced portion of said sheet with an unreinforced portion disposed between said drop leaf means and said table means; means for heating said unreinforced portion to the approximate range of 250° F. to 350° F.; means for supporting a curved member between said table means and said drop leaf means; and a means for moving said drop leaf means relative to said table means, said means including guide means for causing said drop leaf means to follow a fixed path during said movement, said fixed path defining an involute curve generated from a curve corresponding to that of said curved member, whereby said unreinforced portion of said sheet is given a contour corresponding to said curved member.

6. A device for bending unbacked portions of a sheet of postformable material portions of which are backed with rigid reinforcing members, said device comprising table means having a surface for supporting backed portions of said sheet; a drop leaf means adjacent either of two opposite sides of said table means, each drop leaf means having a surface for supporting a reinforced portion of said sheet; means for pivotally connecting each of said drop leaf means to said table means so that each drop leaf means is movable from a raised position with said surface thereof substantially coplanar with said surface of said table means, to a lowered position angularly displaced therefrom; clamping means for fastening said sheet to said table means and a raised drop leaf means with a bendable portion of said sheet disposed between said table means and said raised drop leaf means; means for supporting a curved member adjacent such a bendable portion; means for heating such a bendable portion to the approximate range of 250° F. to 350° F.; and means for effecting said pivotal movement of said drop leaf means when said bendable portion is at such a temperature range, said means for pivotally connecting each of said drop leaf means to said table means including guide means for causing said drop leaf means to follow a fixed curvilinear path during said pivotal movement defined by an involute generated on said curved member whereby said bendable portion is given the exact contour of said curved member.

7. A device as recited in claim 6 in which one of said means for supporting a curved member adjacent a bendable portion permanently secures said curved member in such position, and the other of said means for holding a curved member adjacent a bendable portion is retractable during said pivotal movement of the drop leaf means adjacent thereto; and including in addition means for effecting said retraction of said retractable supporting means.

8. A device for bending a sheet of postformable plastic material having backing members attached to one side thereof the edges of which are in spaced parallelism thereby defining unbacked bendable portion of said sheet, said device comprising a fixture for receiving and holding portions of said sheet with other portions thereof extending beyond said fixture; heater means for heating to the approximate range of between 250° F. and 350° F. an unreinforced portion of said sheet; and a plurality of bending units associated with said fixture, at least one of said units being a convex bending unit for bending convexly the side of said sheet remote from said backing members, and at least one of said bending units being a concave bending unit for bending concavely the side of said sheet remote from said backing members, each of said bending units comprising fixture means for gripping portions of said sheet extending beyond said firstly mentioned fixture with a bendable portion of said sheet is disposed between said fixtures, means for supporting a curved member adjacent said bendable portion, and means for pivoting said bending unit fixture relative to said firstly mentioned fixture, said lastly mentioned means including guide means for causing said bending unit fixture to follow a fixed path during said movement thereby imparting a predetermined contour to said bendable portion, said guide means being arranged so that said contour corresponds to the contour of said adjacent curved member, said lastly mentioned means including means for holding said portion so formed until cool, said convex bending unit including means for retracting the means for supporting the curved member during such a bending operation whereby upon completion of such a bending operation by said unit the curved member associated therewith is disposed between adjacent backing members.

9. The method of forming from postformable material a fully reinforced structure having bent portions, comprising attaching to a substantially flat sheet of said material at least two rigid reinforcing members arranged to provide an unreinforced bendable portion, fixing the first of the portions of said sheet so reinforced relative to the second portion so reinforced, heating said bendable portion to the approximate range of between 250° F. and 350° F. gripping said second portion so reinforced, and pivoting said second reinforced portion relative to said first reinforced portion through an exact path whereby said unreinforced portion is given a predetermined curvature.

10. The method of forming from postformable material a fully reinforced structure having bent portions comprising attaching to one side of a substantially flat sheet of such material at least two rigid reinforcing members in spaced parallelism to provide an unreinforced bendable area therebetween; fixing one of said portions so reinforced relative to the other portion so reinforced; heating said bendable portion to the approximate range of between 250° F. and 350° F.; and pivoting said other portion so reinforced through a predetermined curved path to bend convexly said bendable portion on the side of said sheet to which said reinforcing members are attached; and attaching an additional reinforcing member to said convexly bent portion for thereby providing a reinforcement for all portions of said sheet.

11. The method of providing a reinforced plastic article having at least one bent portion comprising the steps of providing an elongated member with a curved surface interconnecting two edges; attaching to one side of a substantially flat sheet of C-stage thermosetting resinous material rigid backing members in parallelism spaced at a distance substantially equal to the peripheral width of said curved surface to thereby define unreinforced bendable portions of said sheet; supporting said elongated member between adjacent backing members next to an unreinforced portion of said sheet with one edge of said elongated member abutting one edge of a backing member; heating said unreinforced portion to the approximate range of from 250° F. to 350° F.; holding said portion of said sheet the backing member of which abuts said elongated member; and independently of said elongated member guiding the adjacent backed portion of said sheet through a path defined by an involute curve generated on said curved surface, whereby said bendable portion is given the contour of said curved surface and said other edge of said elongated member is brought into abutting engagement with the edge of said adjacent backing member, so that said elongated member forms a reinforcement for the portion of said sheet so bent; and holding said sheet so bent until cool.

12. The method as recited in claim 11 including in addition the steps of providing said curved member with a reversely curved surface, and near the completion of said bend urging a forming member into engagement with said unreinforced portion opposite said reversely curved portion of said curved member thereby to urge said unreinforced portion into intimate contact with said reversely curved portion of said curved member.

References Cited in the file of this patent

UNITED STATES PATENTS

| | | |
|---|---|---|
| Re. 18,808 | Brundage | Apr. 25, 1933 |
| 1,666,649 | Harris | Apr. 17, 1928 |
| 2,183,984 | Campbell | Dec. 19, 1939 |
| 2,214,673 | Hauser | Sept. 10, 1940 |
| 2,382,807 | Nobles | Aug. 14, 1945 |
| 2,648,370 | Beach | Aug. 11, 1953 |

OTHER REFERENCES

Modern Plastics, April 1952, pages 103–105, Counter Tops Moulded to Shape.

Modern Plastics, November 1953, pages 113–115, Beauty Bent for Strength, Convenience, Economy.